(12) United States Patent
Huang et al.

(10) Patent No.: US 12,509,072 B2
(45) Date of Patent: Dec. 30, 2025

(54) TASK-INFORMED BEHAVIOR PLANNING

(71) Applicants: TOYOTA RESEARCH INSTITUTE, INC., Los Altos, CA (US); MASSACHUSETTS INSTITUE OF TECHNOLOGY, Cambridge, MA (US)

(72) Inventors: Xin Huang, Cambridge, MA (US); Guy Rosman, Newton, MA (US); Ashkan Mohammadzadeh Jasour, Merced, CA (US); Stephen G. McGill, Jr., Cambridge, MA (US); John J. Leonard, Newton, MA (US); Brian C. Williams, Cambridge, MA (US)

(73) Assignees: TOYOTA RESEARCH INSTITUTE, INC., Los Altos, CA (US); TOYOTA JIDOSHA KABUSHIKI KAISHA, Aichi-Ken (JP); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 205 days.

(21) Appl. No.: 17/871,628

(22) Filed: Jul. 22, 2022

(65) Prior Publication Data
US 2023/0085422 A1   Mar. 16, 2023

Related U.S. Application Data

(60) Provisional application No. 63/243,492, filed on Sep. 13, 2021.

(51) Int. Cl.
*B60W 30/095*   (2012.01)
*B60W 50/14*   (2020.01)
*B60W 60/00*   (2020.01)

(52) U.S. Cl.
CPC ........ *B60W 30/0956* (2013.01); *B60W 50/14* (2013.01); *B60W 60/0027* (2020.02); *B60W 2554/802* (2020.02)

(58) Field of Classification Search
None
See application file for complete search history.

(56) References Cited

U.S. PATENT DOCUMENTS 11,345,342 B2 *   5/2022   Gutierrez .............. B60W 50/14
11,851,081 B2 *  12/2023   Refaat .................... G06N 3/045
(Continued)

OTHER PUBLICATIONS

Huang, et al., "CARPAL: Confidence-Aware Intent Recognition for Parallel Autonomy," IEEE Robotics and Automation Letters 2021, pp. 1-1. 10. Published online at arXiv:2003.08003 on Mar. 17, 2021.
(Continued)

*Primary Examiner* — Justin S Lee
*Assistant Examiner* — Elizabeth Galyn Martinez
(74) *Attorney, Agent, or Firm* — Seyfarth Shaw LLP

(57) ABSTRACT

A method for task-informed planning by a behavior planning system of a vehicle includes observing a previous trajectory of an agent within a distance from the vehicle. The method also includes predicting, by the behavior planning system, a set of potential trajectories for the agent and/or the vehicle based on observing the previous trajectory. The method further includes selecting, by the behavior planning system, a potential action from a set of potential actions associated with a task to be performed by the vehicle, each potential action being associated with a utility value based on the respective potential action and the set of potential trajectories, the selected potential action being associated with a highest utility value of respective utility values associated with the set of potential actions. The method still further includes controlling the vehicle to perform an action asso-
(Continued)

ciated with the potential action selected by the behavior planning system.

20 Claims, 6 Drawing Sheets

(56)                   References Cited

U.S. PATENT DOCUMENTS

| | | | |
|---|---|---|---|
| 11,981,349 B2* | 5/2024 | Nister | G05D 1/646 |
| 2018/0141544 A1* | 5/2018 | Xiao | G01C 21/3469 |
| 2019/0382007 A1 | 12/2019 | Casas et al. | |
| 2021/0009121 A1* | 1/2021 | Oboril | B60W 60/0015 |
| 2021/0173402 A1* | 6/2021 | Chang | G05D 1/0221 |
| 2021/0200212 A1* | 7/2021 | Urtasun | G05D 1/0214 |
| 2021/0279511 A1 | 9/2021 | Gordon et al. | |
| 2021/0354718 A1 | 11/2021 | Lu et al. | |

OTHER PUBLICATIONS

Sadat, et al., "Jointly Learnable Behavior and Trajectory Planning for Self-Driving Vehicles," 2019 IEEE/RSJ International Conference on Intelligent Robots and Systems (IROS). Published online at arXiv:1910.04586 on Oct. 10, 2019.

* cited by examiner

TASK-INFORMED BEHAVIOR PLANNING

CROSS-REFERENCE TO RELATED APPLICATIONS

The present application claims the benefit of U.S. Provisional Patent Application No. 63/243,492, filed on Sep. 13, 2021, and titled "TASK-INFORMED MOTION PREDICTION FOR INTELLIGENT SYSTEMS," the disclosure of which is expressly incorporated by reference in its entirety.

BACKGROUND

Field

Certain aspects of the present disclosure generally relate to controlling an ego agent and, more particularly, to a system and method for controlling the ego agent based on a behavior of a road agent predicted in view of a task of the ego agent.

Background

Autonomous agents, such as vehicles or robots, may use onboard sensors to navigate through an environment. In some examples, a behavior prediction system may predict a behavior of one or more surrounding objects, such as road agents. The predicted behavior may be used by a planning system to plan a trajectory for an ego agent associated with the planning system. In some examples, a posterior distribution of future behaviors of a road agent may be used to predict the behavior (e.g., future trajectory) of the road agent. Some other planning systems use a learning-based method to learn agent dynamics, social context, and map context. The prediction accuracy of learning-based systems may be quantified through one or more measurements, including distance-based metrics, such as minimum average displacement error (ADE) and final displacement error (FDE), and distribution-based metrics, such as negative log-likelihood (NLL). Still, some conventional behavior prediction systems may be task-agnostic, such that metrics for determining prediction accuracy do not account for whether a predicted behavior affects a downstream task of an ego agent.

In some examples, conventional behavior prediction systems leverage a learned behavior predictor to support one or more tasks, including risk assessment, driver safety detection, and/or behavior planning. Such conventional behavior prediction systems may decouple optimization of a predictor and optimization of the task by pre-training a predictor and feeding the prediction results in a task optimization step. In such examples, weights associated with the prediction results may be frozen when fed to the task optimization step. As a result, the predictor is unaware of its influence on the downstream task and may not generate a prediction that is informative for the downstream task. It may be desirable to improve behavior predictors to consider a task associated with the ego agent when predicting the behavior of one or more road agents.

SUMMARY

In one aspect of the present disclosure, a method for task-informed planning by a behavior planning system of a vehicle includes observing a previous trajectory of an agent that is within a distance from the vehicle. The method further includes predicting, by the behavior planning system, a set of potential trajectories for one or both of the agent and the vehicle based on observing the previous trajectory. The method still further includes selecting, by the behavior planning system, a potential action from a set of potential actions associated with a task to be performed by the vehicle, each potential action being associated with a utility value based on the respective potential action and the set of potential trajectories, the selected potential action being associated with a highest utility value of respective utility values associated with the set of potential actions. The method also includes controlling the vehicle to perform an action associated with the potential action selected by the behavior planning system.

Another aspect of the present disclosure is directed to an apparatus including means for observing a previous trajectory of an agent that is within a distance from the vehicle. The apparatus further includes means for predicting, by the behavior planning system, a set of potential trajectories for one or both of the agent and the vehicle based on observing the previous trajectory. The apparatus still further includes means for selecting, by the behavior planning system, a potential action from a set of potential actions associated with a task to be performed by the vehicle, each potential action being associated with a utility value based on the respective potential action and the set of potential trajectories, the selected potential action being associated with a highest utility value of respective utility values associated with the set of potential actions. The apparatus also includes means for controlling the vehicle to perform an action associated with the potential action selected by the behavior planning system.

In another aspect of the present disclosure, a non-transitory computer-readable medium with non-transitory program code recorded thereon is disclosed. The program code is executed by a processor and includes program code to observe a previous trajectory of an agent that is within a distance from the vehicle. The program code further includes program code to predict, by the behavior planning system, a set of potential trajectories for one or both of the agent and the vehicle based on observing the previous trajectory. The program code still further includes program code to select, by the behavior planning system, a potential action from a set of potential actions associated with a task to be performed by the vehicle, each potential action being associated with a utility value based on the respective potential action and the set of potential trajectories, the selected potential action being associated with a highest utility value of respective utility values associated with the set of potential actions. The program code also includes program code to control the vehicle to perform an action associated with the potential action selected by the behavior planning system.

Another aspect of the present disclosure is directed to an apparatus having a processor and a memory coupled with the processor. The memory stores instructions operable, when executed by the processor, to cause the apparatus to observe a previous trajectory of an agent that is within a distance from the vehicle. Execution of the instructions further cause the apparatus to predict a set of potential trajectories for one or both of the agent and the vehicle based on observing the previous trajectory. Execution of the instructions also cause the apparatus to select a potential action from a set of potential actions associated with a task to be performed by the vehicle, each potential action being associated with a utility value based on the respective potential action and the set of potential trajectories, the selected potential action being associated with a highest utility value of respective utility values associated with the set of potential actions. Execution of the instructions further cause the apparatus to control the vehicle to perform an action associated with the potential action selected by the behavior planning system.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
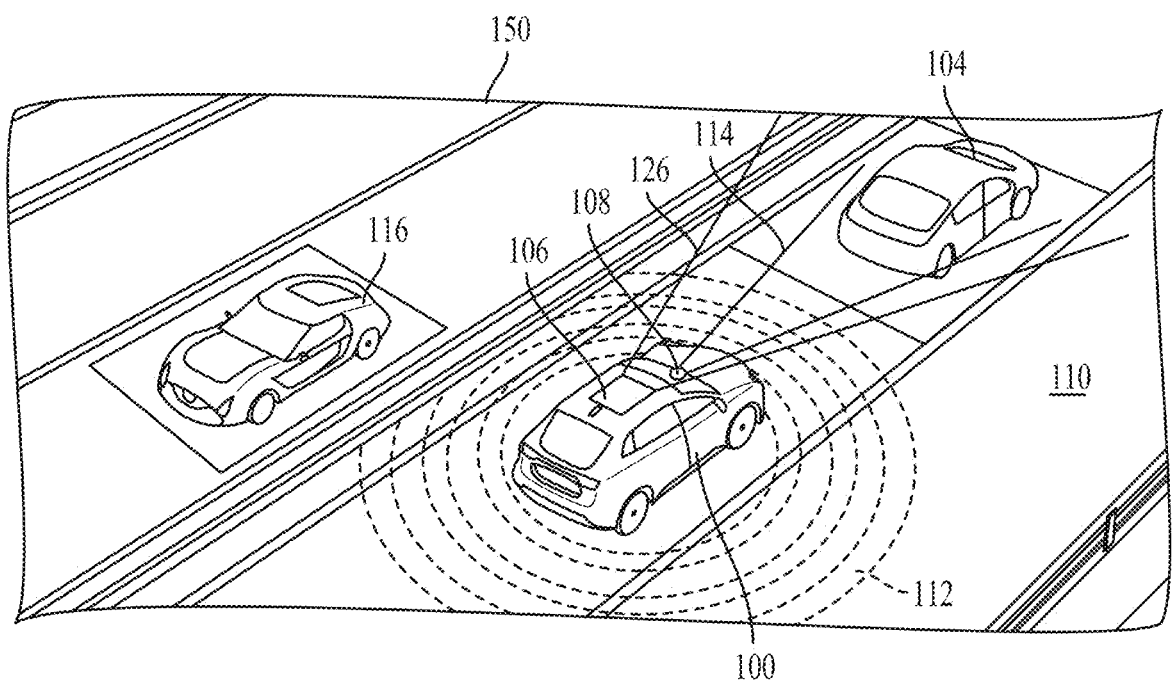
FIGS. 1A and 1B are diagrams illustrating examples of a vehicle, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As discussed, autonomous agents, such as vehicles or robots, may use onboard sensors to navigate through an environment. In some examples, a behavior prediction system may predict a behavior, such as a trajectory, of one or more surrounding objects, such as road agents. The predicted behavior may be used by a planning system to plan a trajectory for an ego agent associated with the planning system. In some examples, a posterior distribution of future behaviors of a road agent may be used to predict the motion of the road agent. Some other planning systems use a learning-based method to learn agent dynamics, social context, and map context.

In some conventional behavior prediction systems, the behavior prediction system may be unaware of its influence on a downstream task and may not generate a prediction that is informative for the downstream task. For example, a behavior prediction system may predict that a road agent may veer to the left or right, where both predictions have the same accuracy based on a minimum average displacement error (ADE), a final displacement error (FDE), and/or a negative log-likelihood (NLL). Still, in this example, each prediction (e.g., veer left or veer right) may lead to different outcomes for a downstream task, such as route planning or warning generation. As an example, one of the predictions may lead to an unsafe plan for the ego agent, while another prediction may allow the ego agent to mitigate a potential collision.

Some conventional behavior prediction systems approximate a utility and an associated uncertainty in a downstream driver safety detection task, when predicting future driver trajectories. In such examples, the regressed utility statistics may be relevant to a downstream task, however, the predicted trajectories are learned with a single objective of optimizing accuracy. In contrast, aspects of the present disclosure integrate a task utility into a trajectory prediction, thereby improving a correlation between prediction results and a downstream task.

Other conventional prediction and planning systems jointly optimize a predictor and a planner, so that the training of the predictor depends on results from the planner. Such conventional systems use a training pipeline that includes a differentiable planner so that the planner loss can be back-propagated into the predictor. In contrast, aspects of the present disclosure are directed to a prediction model that uses a utility function that characterizes the task. The utility function may be used during training. As a result, the prediction model may be more versatile in comparison to conventional systems because it can be applied to non-differentiable planners that are difficult to train.

As discussed, it may be desirable to improve behavior predictors to consider a task associated with the ego agent when predicting the behavior of one or more road agents. Various aspects of the present disclosure are directed to a task-informed behavior prediction system that jointly considers prediction accuracy and task utility. The task-informed behavior prediction system may be used in conjunction with a planner that plans one or more downstream tasks for an ego agent. During training, the task-informed behavior prediction system may be optimized based on a utility of the downstream task. In some examples, a prediction model of the task-informed behavior prediction system accounts for both a prediction accuracy and the utility of downstream task given the predictions of ego agent behavior and/or ado agent behavior. Accounting for both the prediction accuracy and the utility of the downstream task improves an integration between a prediction and the downstream task. In some examples, the task-informed behavior prediction system is trained with a task utility function that determines the task utility. The task utility function may use full task information or a specification of the utility of the task. In some examples, the task-informed behavior prediction system may be integrated with a planning system in a plug-and-play manner to be used for a range of downstream tasks.

FIG. 1A is a diagram illustrating an example of a vehicle 100 in an environment 150, in accordance with various aspects of the present disclosure. In the example of FIG. 1A, the vehicle 100 may be an autonomous vehicle, a semi-autonomous vehicle, or a non-autonomous vehicle. As shown in FIG. 1A, the vehicle 100 may be traveling on a road 110. A first vehicle 104 may be ahead of the vehicle 100 and a second vehicle 116 may be adjacent to the ego vehicle 100. In this example, the vehicle 100 may include a 2D camera 108, such as a 2D red-green-blue (RGB) camera, and a LIDAR sensor 106. Other sensors, such as RADAR and/or ultrasound, are also contemplated. Additionally, or alternatively, although not shown in FIG. 1A, the vehicle 100 may include one or more additional sensors, such as a camera, a RADAR sensor, and/or a LIDAR sensor, integrated with the vehicle in one or more locations, such as within one or more storage locations (e.g., a trunk). Additionally, or alternatively, although not shown in FIG. 1A, the vehicle 100 may include one or more force measuring sensors.

In one configuration, the 2D camera 108 captures a 2D image that includes objects in the 2D camera's 108 field of view 114. The LIDAR sensor 106 may generate one or more output streams. The first output stream may include a 3D cloud point of objects in a first field of view, such as a 360° field of view 112 (e.g., bird's eye view). The second output stream 124 may include a 3D cloud point of objects in a second field of view, such as a forward facing field of view.

The 2D image captured by the 2D camera includes a 2D image of the first vehicle 104, as the first vehicle 104 is in the 2D camera's 108 field of view 114. As is known to those of skill in the art, a LIDAR sensor 106 uses laser light to sense the shape, size, and position of objects in an environment. The LIDAR sensor 106 may vertically and horizontally scan the environment. In the current example, the artificial neural network (e.g., autonomous driving system) of the vehicle 100 may extract height and/or depth features from the first output stream. In some examples, an autonomous driving system of the vehicle 100 may also extract height and/or depth features from the second output stream.

The information obtained from the sensors 106, 108 may be used to evaluate a driving environment. In some examples, the information obtained from the sensors 106, 108 may identify whether the vehicle 100 is at an interaction or a crosswalk. Additionally, or alternatively, the information obtained from the sensors 106, 108 may identify whether one or more dynamic objects, such as pedestrians, are near the vehicle 100.

Figure 1B:
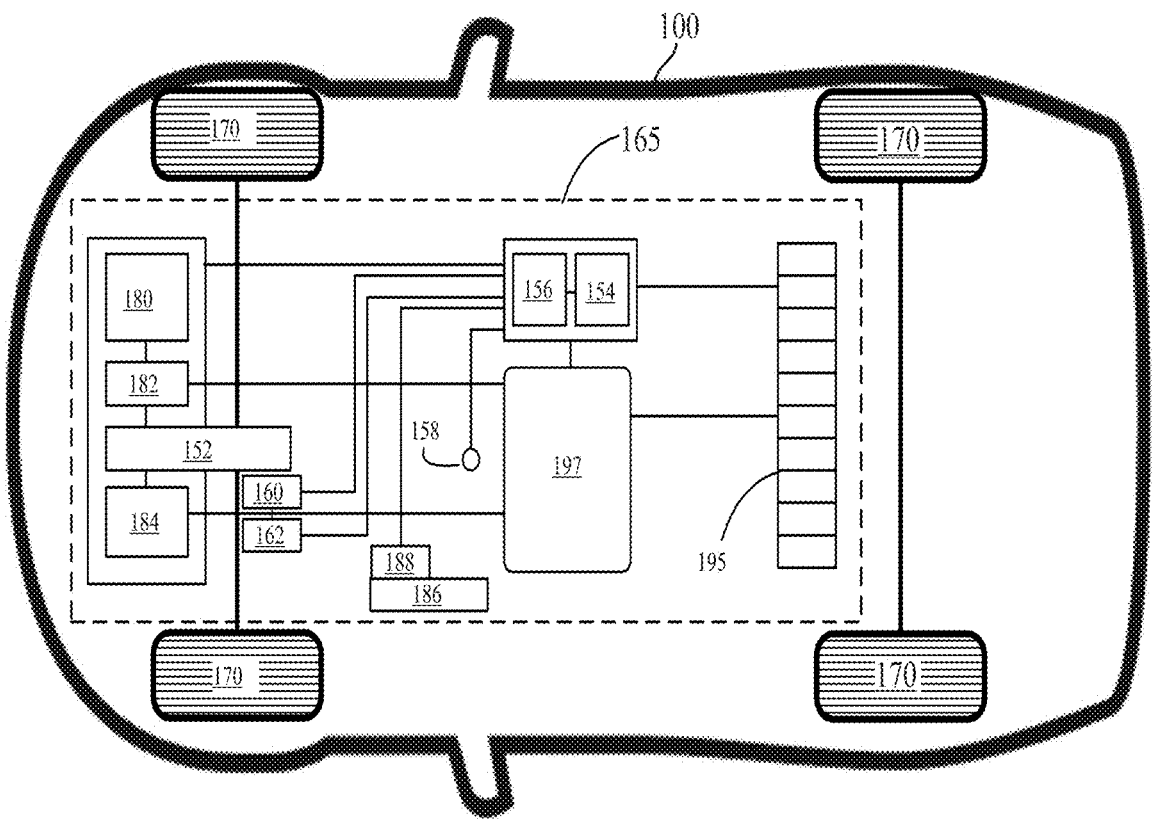

FIG. 1B is a diagram illustrating an example the vehicle 100 in which various aspects of the present disclosure may be implemented. It should be understood that various aspects of the present disclosure may be directed to an autonomous vehicle. The autonomous vehicle may include be an internal combustion engine (ICE) vehicle, fully electric vehicle (EVs), or another type of vehicle. The vehicle 100 may include drive force unit 165 and wheels 170. The drive force unit 165 may include an engine 180, motor generators (MGs) 182 and 184, a battery 195, an inverter 197, a brake pedal 186, a brake pedal sensor 188, a transmission 152, a memory 154, an electronic control unit (ECU) 156, a shifter 158, a speed sensor 160, and an accelerometer 162.

The engine 180 primarily drives the wheels 170. The engine 180 can be an ICE that combusts fuel, such as gasoline, ethanol, diesel, biofuel, or other types of fuels which are suitable for combustion. The torque output by the engine 180 is received by the transmission 152. MGs 182 and 184 can also output torque to the transmission 152. The engine 180 and MGs 182 and 184 may be coupled through a planetary gear (not shown in FIG. 1B). The transmission 152 delivers an applied torque to one or more of the wheels 170. The torque output by engine 180 does not directly translate into the applied torque to the one or more wheels 170.

MGs 182 and 184 can serve as motors which output torque in a drive mode, and can serve as generators to recharge the battery 195 in a regeneration mode. The electric power delivered from or to MGs 182 and 184 passes through the inverter 197 to the battery 195. The brake pedal sensor 188 can detect pressure applied to brake pedal 186, which may further affect the applied torque to wheels 170. The speed sensor 160 is connected to an output shaft of transmission 152 to detect a speed input which is converted into a vehicle speed by ECU 156. The accelerometer 162 is connected to the body of vehicle 100 to detect the actual deceleration of vehicle 100, which corresponds to a deceleration torque.

The transmission 152 may be a transmission suitable for any vehicle. For example, transmission 152 can be an electronically controlled continuously variable transmission (ECVT), which is coupled to engine 180 as well as to MGs 91 and 92. Transmission 20 can deliver torque output from a combination of engine 180 and MGs 91 and 92. The ECU 156 controls the transmission 152, utilizing data stored in memory 154 to determine the applied torque delivered to the wheels 170. For example, ECU 156 may determine that at a certain vehicle speed, engine 180 should provide a fraction of the applied torque to the wheels 170 while one or both of the MGs 182 and 184 provide most of the applied torque. The ECU 156 and transmission 152 can control an engine speed (NE) of engine 180 independently of the vehicle speed (V).

The ECU 156 may include circuitry to control the above aspects of vehicle operation. Additionally, the ECU 156 may include, for example, a microcomputer that includes a one or more processing units (e.g., microprocessors), memory storage (e.g., RAM, ROM, etc.), and I/O devices. The ECU 156 may execute instructions stored in memory to control one or more electrical systems or subsystems in the vehicle. Furthermore, the ECU 156 can include one or more electronic control units such as, for example, an electronic engine control module, a powertrain control module, a transmission control module, a suspension control module, a body control module, and so on. As a further example, electronic control units may control one or more systems and functions such as doors and door locking, lighting, human-machine interfaces, cruise control, telematics, braking systems (e.g., anti-lock braking system (ABS) or electronic stability control (ESC)), or battery management systems, for example. These various control units can be implemented using two or more separate electronic control units, or a single electronic control unit.

The MGs 182 and 184 each may be a permanent magnet type synchronous motor including for example, a rotor with a permanent magnet embedded therein. The MGs 182 and 184 may each be driven by an inverter controlled by a control signal from ECU 156 so as to convert direct current (DC) power from the battery 195 to alternating current (AC) power, and supply the AC power to the MGs 182 and 184. In some examples, a first MG 182 may be driven by electric power generated by a second MG 184. It should be understood that in embodiments where MGs 182 and 184 are DC motors, no inverter is required. The inverter, in conjunction with a converter assembly may also accept power from one or more of the MGs 182 and 184 (e.g., during engine charging), convert this power from AC back to DC, and use this power to charge battery 195 (hence the name, motor generator). The ECU 156 may control the inverter, adjust driving current supplied to the first MG 182, and adjust the current received from the second MG 184 during regenerative coasting and braking.

The battery 195 may be implemented as one or more batteries or other power storage devices including, for example, lead-acid batteries, lithium ion, and nickel batteries, capacitive storage devices, and so on. The battery 195 may also be charged by one or more of the MGs 182 and 184, such as, for example, by regenerative braking or by coasting during which one or more of the MGs 182 and 184 operates as generator. Alternatively (or additionally, the battery 195 can be charged by the first MG 182, for example, when vehicle 100 is in idle (not moving/not in drive). Further still, the battery 195 may be charged by a battery charger (not shown) that receives energy from engine 180. The battery charger may be switched or otherwise controlled to engage/disengage it with battery 195. For example, an alternator or generator may be coupled directly or indirectly to a drive shaft of engine 180 to generate an electrical current as a result of the operation of engine 180. Still other embodiments contemplate the use of one or more additional motor generators to power the rear wheels of the vehicle 100 (e.g., in vehicles equipped with 4-Wheel Drive), or using two rear motor generators, each powering a rear wheel.

The battery 195 may also power other electrical or electronic systems in the vehicle 100. In some examples, the battery 195 can include, for example, one or more batteries, capacitive storage units, or other storage reservoirs suitable for storing electrical energy that can be used to power one or both of the MGs 182 and 184. When the battery 195 is implemented using one or more batteries, the batteries can include, for example, nickel metal hydride batteries, lithium ion batteries, lead acid batteries, nickel cadmium batteries, lithium ion polymer batteries, or other types of batteries.

The vehicle 100 may operate in one of an autonomous mode, a manual mode or a semi-autonomous mode. In the manual mode, a human driver manually operates (e.g., controls) the vehicle 100. In the autonomous mode, an autonomous control system (e.g., autonomous driving system) operates the vehicle 100 without human intervention. In the semi-autonomous mode, the human may operate the vehicle 100, and the autonomous control system may override or assist the human. For example, the autonomous control system may override the human to prevent a collision or to obey one or more traffic rules.

As discussed, autonomous agents, such as vehicles or robots, may use onboard sensors to navigate through an environment. In some examples, a behavior prediction system may predict a behavior of one or more surrounding objects, such as road agents. The predicted behavior may be used by a planning system to plan a trajectory for an ego agent associated with the planning system. In some examples, a posterior distribution of future behaviors of a road agent may be used to predict the behavior of the road agent. Some other behavior planning systems use a learning-based method to learn agent dynamics, social context, and map context.

Figure 2A:
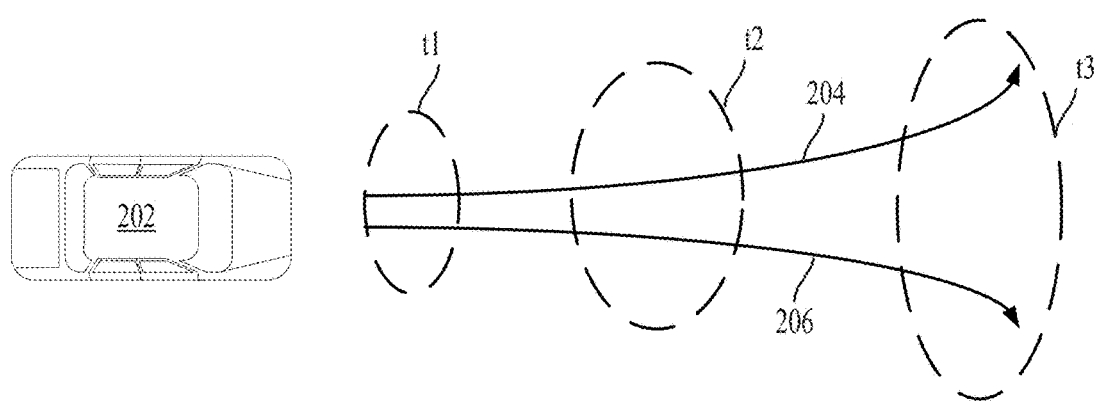
FIG. 2A is a block diagram illustrating an example of predicting a future behavior of a road agent, in accordance with various aspects of the present disclosure.

FIG. 2A is a block diagram illustrating an example of predicting a future behavior of a road agent 202 (e.g., ado agent). In the example of FIG. 2A, the road agent 202 may be an autonomous vehicle or another type of dynamic object, such as a pedestrian or a bicyclist. As shown in FIG. 2A, two different future behaviors 204, 206 may be predicted for the road agent 202. Additionally, a ground truth future distribution 208 may be defined at each time step t1, t2, t3. In the example of FIG. 2A, each future behavior 204, 206 may have the same prediction error, in terms of a likelihood based on the ground truth future distribution 208 of each time step t1, t2, t3. That is, the two different future behaviors 204, 206 may be equally accurate when evaluated by a task-agnostic accuracy-based metric.

Figure 2B:
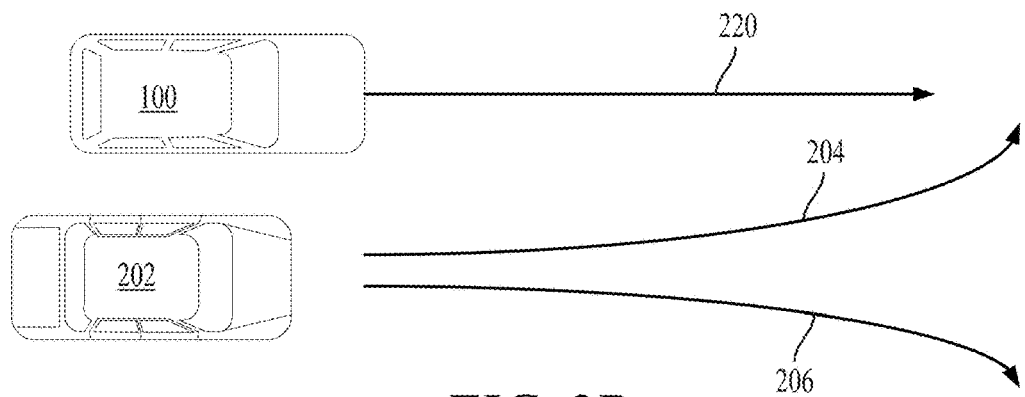
FIGS. 2B and 2C are block diagrams illustrating examples of planning a trajectory of an ego agent, in accordance with various aspects of the present disclosure.
Figure 2C:
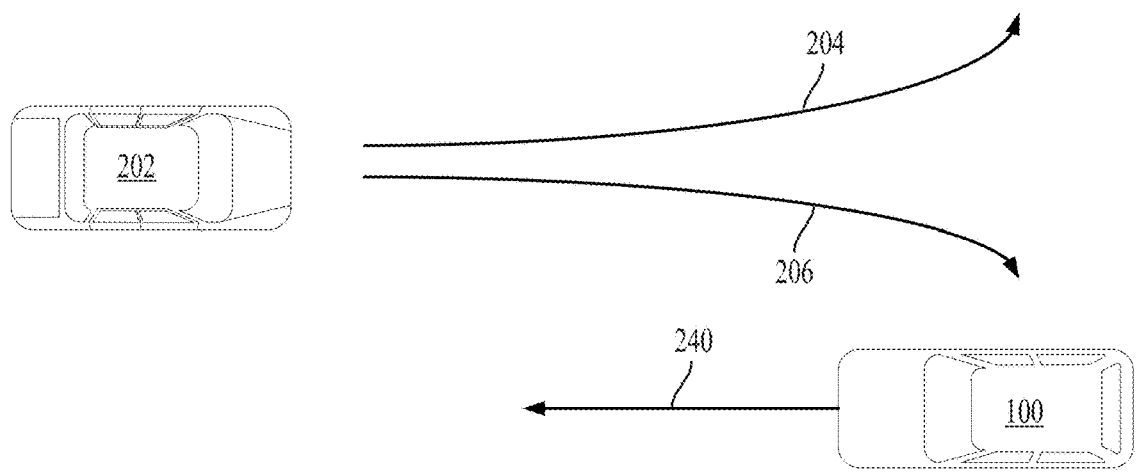

In some examples, the predicted future behavior 204, 206 of the road agent 202 may be used to plan a trajectory of an ego agent. FIG. 2B is a block diagram illustrating an example of planning a trajectory 220 of an ego agent 100, in accordance with various aspects of the present disclosure. In FIGS. 2B and 2C, the ego agent 100 may be an example of the vehicle 100 described with reference to FIGS. 1A and 1B. In the example of FIG. 2B, a first future behavior 204 may be preferred over a second future behavior 206 because a planning system associated with the ego agent 100 may identify a potential collision based on the first future behavior 204. The planning system may adjust the trajectory 220 of the ego agent 100 given the first future behavior 204. In contrast, in the example of FIG. 2B, the second future behavior 206 may not be preferred because the ego agent 100 may collide with the road agent 202 if the second future behavior 206 is incorrect. That is, in some examples, the road agent 202 may perform the first future behavior 204 instead of the second future behavior 206. In such examples, the ego agent 100 may collide with the road agent 202 if the trajectory 220 of the ego agent 100 was planned based on the second future behavior 206.

In some other examples, the second future behavior 206 may be preferred over the first future behavior 204. One such example is shown in FIG. 2C, which illustrates a block diagram illustrating an example of planning a trajectory 240 of an ego agent 100, in accordance with various aspects of the present disclosure. In the example of FIG. 2C, the second future behavior 206 may be preferred over the first future behavior 204 because a planning system associated with the ego agent 100 may identify a potential collision based on the second future behavior 206. The planning system may adjust the trajectory 240 of the ego agent 100 given the second future behavior 206. In contrast, in the example of FIG. 2B, first future behavior 204 may not be preferred because the ego agent 100 may collide with the road agent 202 if first future behavior 204 is incorrect. That is, in some examples, the road agent 202 may perform the second future behavior 206 instead of the first future behavior 204. In such examples, the ego agent 100 may collide with the road agent 202 if the trajectory 240 of the ego agent 100 was planned based on the first future behavior 204.

A planning system of an ego agent may prevent potential collisions based on an estimate of a future trajectory of a nearby road agent. These predictions may be provided by a behavior prediction system to assist decision making by a planning system. In some examples, the behavior prediction system may characterize nearby road agents and their future actions, and may also provide approximate statistics for a task. The behavior prediction system may accommodate a variety of decision making tasks as opposed to a specific task, such that the behavior prediction system may be used for a variety of applications.

As discussed, aspects of the present disclosure are directed to a task-informed behavior predictor that is trained by jointly optimizing prediction accuracy and a performance of a downstream task. Decision making is an example of a downstream task. In one such example, a vehicle planner may determine a path (e.g., trajectory) for a vehicle given a behavior of other vehicles or objects near the vehicle. As another example, a warning system may implement a decision making system to determine whether to generate a warning given the behavior of other vehicles of objects near an ego vehicle. In the discussed examples, one or more decisions may be correct and one or more decisions may be incorrect. In some implementations, a training loss leverages a specification of the task, such as a utility function of the task, instead of ignoring the task or co-training the task (e.g., optimizing a specific planner with the predictor). In contrast to conventional behavior prediction systems, the task-informed behavior predictor may generate predictions that improve performance of the downstream task by providing relevant information to the task given limited samples. The performance may be measured by a utility function associated with the downstream task. In addition, that task-informed behavior predictor may accommodate a variety of decision making tasks within intelligent systems, such as autonomous driving systems. As discussed, the task-informed behavior predictor may leverage a utility function that characterizes the task.

For ease of explanation, the task-informed behavior predictor may be referred to as a behavior predictor, a predictor, or a prediction system. In some implementations, the prediction system receives, as an input, task-specific information V and observed agent trajectories $O=\{o_t\}_{t=-T_p+1}^{0}$ over a fixed past horizon $T_p$, where $o_t=[o_{1,t}, \ldots, o_{N,t}]$ includes continuous positions at time step t for up to N agents. The task input V may be dependent on specific information from a task, such as a planned trajectory of the ego agent. An output of the behavior predictor is a weighted set of K trajectory predictions $S=\{(w^{(k)}, x^{(k)})\}_{k=1}^{K}$ for ado agents, where $x^{(k)}=\{x_t^{(k)}\}_{t=1}^{T_f}$ denotes future trajectory sequences of the respective agents. As discussed below, in some examples, the weighted set of K trajectory samples S are joint samples for an ego agent and an ado agent. That is, $x^{(k)}=[x_{1,t}^{(k)}, \ldots, x_{N,t}^{(k)}]$, up to a fixed future horizon $T_f$.

In some aspects, the task-informed prediction provides estimates of task utility for a downstream task, such as a decision making task. The utility (e.g., reward) serves as a quantitative measurement of task performance. In some examples, the task specification may be defined as a tuple ($\mathcal{I}$, u), where $\mathcal{I}$ is a set of candidate decisions for the task, such as trajectory plans of the ego agent or a warning decision, and u is a differentiable utility function mapping a decision $I \in \mathcal{I}$ and the task-informed predictions $S$ to a scalar that quantitatively measures the performance of the decision. For ease of explanation, $u_I=u(I, S)$. The utility u of a decision I may determine whether a decision I was satisfactory (e.g., good) given the prediction $S$. The model may be optimized based on the utility function u that supports various tasks without using a specific task pipeline.

In one example, a warning system may be specified to generate a warning when a distance between a vehicle and a pedestrian is less than a threshold. In such examples, the candidate decisions $\mathcal{I}$ may include generating a warning and not generating a warning. For a decision I to generate a warning, a utility u of not generating the warning when the distance to a pedestrian is less than a threshold is less than a utility u of generating the warning when the distance to the pedestrian is less than the threshold In some aspects, the task objective may be specified to maximize a probability of selecting an optimal decision:

$$R_{task} = \mathbb{P}_I(I_{GT}), \quad (1)$$

where $\mathbb{P}_I$ may be derived from a softmax function over decision utilities, $$\mathbb{P}_I = \frac{\exp(u_i)}{\sum_{I' \in \mathcal{J}} \exp(u_{I'})}.$$

In EQUATION 1, $I_{GT} \in \mathcal{I}$ represents the ground truth optimal decision in the data according to the same utility function u. Furthermore, I' represents a set of correct and incorrect decisions.

Figure 3:
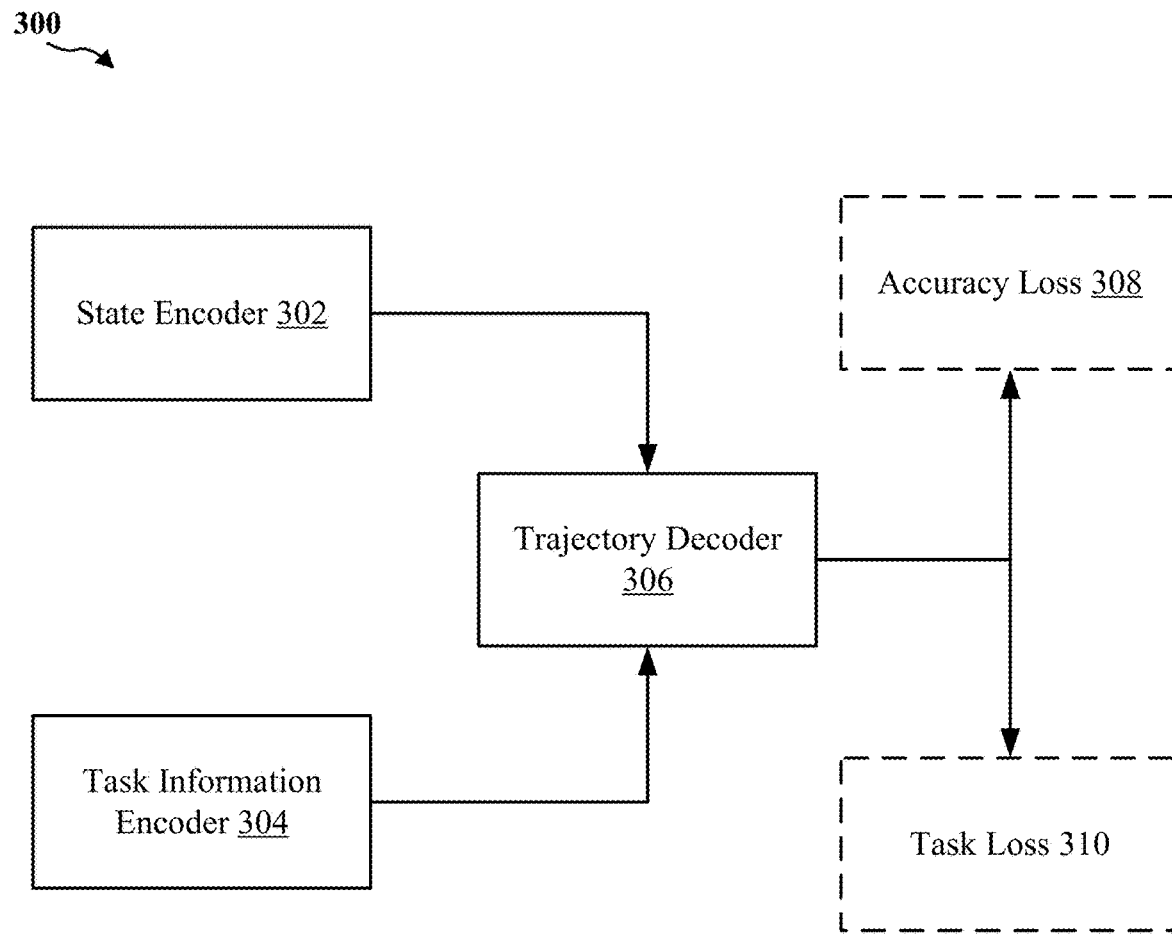
FIG. 3 is a block diagram illustrating an example of a task-informed behavior prediction model, in accordance with various aspects of the present disclosure.

In some examples, the behavior predictor leverages an encoder-decoder model. FIG. 3 is a block diagram illustrating an example of a task-informed behavior prediction model 300, in accordance with various aspects of the present disclosure. As shown in the example of FIG. 3, the task-informed behavior prediction model 300 includes a state encoder 302 that encodes observed past agent states, a task information encoder 304 that encodes additional task input, and a trajectory decoder 306 that decodes future trajectory predictions. The model 300 may be trained via an accuracy loss 308 ($\mathcal{L}_{acc}$) that optimizes prediction accuracy and a task loss 310 ($\mathcal{L}_{task}$) that guides the model 300 to favor predictions supporting the downstream task.

In the example of FIG. 3, the state encoder 302 leverages a long short-term memory (LSTM) to encode observed agent trajectories $S$ into a hidden state $h_S$. The task information encoder 304 encodes task-specific inputs V, such as a future plan of the ego agent, through a separate model into a separate hidden state $h_V$. The structure of the task information encoder depends on a representation of the input. The trajectory decoder model 306 takes the concatenated encoded states from both encoders, $h = h_S \oplus h_V$, and predicts a weight set of K joint trajectory samples $S$. The model 300 may be trained by jointly optimizing prediction accuracy and task performance, $$\mathcal{L} = \mathcal{L}_{acc} - \alpha \mathcal{L}_{task}, \quad (2)$$

where $\alpha$ is a variable that represents a relative weight between two terms.

An accuracy loss $\mathcal{L}_{acc}$ measures an accuracy of the prediction samples compared to the ground truth future trajectory $\hat{S}$. The loss term may be determined as follows:

$$\mathcal{L}_{acc} = \Sigma_{k=1}^{K} \mathbb{1}_{(k=\hat{k})}(\log w^{(k)} + \|x^{(k)} - \hat{S}\|_2), \quad (3)$$

where $\hat{k}$ represents an index of a best prediction sample, in terms of L2 distance to a ground truth trajectory.

In EQUATION 2, the task term $\mathcal{L}_{task}$ minimizes a cross entropy between a probability over decisions and the ground truth optimal decision to encourage the model 300 to maximize the probability of selecting the optimal decision. That is, by minimizing the cross entropy between the probability over decisions and the ground truth optimal decision, a utility u of a correct decision I may be greater than a utility u of an incorrect decision I.

$$\mathcal{L}_{task} = \text{CrossEntropy}(\mathbb{P}_p, I_{GT}). \quad (4)$$

By minimizing the cross entropy, the behavior planning system may be trained to select a correct decision regardless of a prediction set, where the prediction set includes predicted behaviors of one or more dynamic objects near an ego agent. In some examples, the prediction set also includes predicted behaviors of the ego agent.

Behavior planning, such as route planning, precollision warning, and/or trajectory planning, may be considered a core task in most autonomous systems, such as autonomous driving system, in which an ego agent is controlled to navigate safely in the presence of other agents, such as other autonomous and non-autonomous agents. In some examples, the autonomous system may be equipped with a planner that generates a set of M motion plan candidates $\mathcal{J}_p = \{\mathcal{T}_1, \ldots, \mathcal{T}_M\}$. The planning utility function is defined to capture safety and efficiency:

$$u_p(\mathcal{T}, S) = u_{efficiency}(\mathcal{T}) + \beta u_{safety}(\mathcal{T}, S), \quad (5)$$

where $\mathcal{T}$ is an ego plan candidate and the predictions $S = \{(w^{(k)}, x_{ado}^{(k)})\}_{k=1}^{K}$ represents a weighted set of road agent (e.g., ado agent) predictions generated from the behavior predictor. In some examples, the behavior predictor receives an input of observed agent states and the ego plan $\mathcal{T}$ as the task input V to generate prediction samples S. The efficiency term $u_{efficiency}$ measures the traveled distance of the ego plan. The safety term $u_{safety}$ measures the expected closest distance between the ego plan $\mathcal{T}$ and the road agent predictions S, computed as follows:

$$u_{safety}(\mathcal{T}, S) = \Sigma_{k=1}^{K} w^{(k)} \min_{t=1 \ldots T_f} \|\mathcal{T}_t - x_{ado,t}^{(k)}\|_2. \quad (6)$$

In some examples, an improvement of the safety utility diminishes if the agents are far away from each other. Therefore, in such examples, the utility may be upper bounded by a safety threshold $d_{safe}$:

$$u_{safety}(\mathcal{T}, S) = \min(d_{safe}, \Sigma_{k=1}^{K} w^{(k)} \min_{t=1 \ldots T_f} \|\mathcal{T}_t - x_{ado,t}^{(k)}\|_2). \quad (7)$$

In the route planning example, during deployment, the behavior planning system may select an ego plan $\mathcal{T}$ that maximizes the efficiency term $u_{efficiency}$ and the safety term $u_{safety}$ based on the road agent predictions S.

In some examples, an ego agent may include a pre-collision warning system. The pre-collision warning system may be a component of a vehicle shared-control framework that monitors driver actions and generates a warning before an unsafe event occurs. The warning system may differ from the planning system. First, the warning system may use a joint predictor for both the ego agent and a road agent. In such examples, the ego agent may be operated in a manual mode or a semi-autonomous mode by a driver and the future path of the ego agent may be unknown to the joint predictor. The joint predictor may predict the future behavior of both the ego agent and the road agent to determine if a near collision is likely. Second, the warning system may not provide a task-specific input to the predictor, because the warning system may be limited to sending a warning to the driver. As a result, the predictor produces prediction samples S based on observed agent state inputs.

The warning system may be a binary decision making system that selects an action from $\mathcal{J}_W = \{\text{warn}, \neg\text{warn}\}$. The utility of a warning action may be equivalent to a likelihood of a collision between the road agent and the ego agent. That is, a utility may increase as a likelihood of a collision increases. To compute the near collision likelihood, a two-step procedure may base used based on joint prediction samples $S = \{(w^{(k)}, x_{ego}^{(k)}, x_{ado}^{(k)})\}_{k=1}^{K}$, where the prediction samples S include ego agent predictions $x_{ego}^{(k)}$ and road agent predictions $x_{ado}^{(k)}$. The system may first determine a collision score $r^{(k)} \in \{0,1\}$ as a Boolean value for each of the K trajectory samples:

$$r^{(k)} = \left( \min_{t=1 \ldots T_f} \|x_{ego,t}^{(k)} - x_{ado,t}^{(k)}\|_2 < d_{warn} \right), \quad (8)$$

where $d_{warn}$ is a minimum safety distance threshold. The collision score may be 1 if a closest distance between two agents (e.g., ego agent and road agent) is less than the minimum safety distance threshold and the collision score may be 0 if the closest distance between the two agents (e.g., ego agent and road agent) is greater than the minimum safety distance threshold.

In some examples, an overall collision likelihood may be determined by taking the expected collision score r as a weighted sum of individual warning scores:

$$u_{W(warn)} = r = \Sigma_{k=1}^{K} w^{(k)} r^{(k)}. \quad (9)$$

A utility of ¬warn is a likelihood that a near collision will not occur, $u_W(\neg\text{warn}) = 1 - u_W(\text{warn})$. To compute a ground truth optimal decision, a likelihood of near collision from the observed future trajectories may be determined following the same procedure in EQUATION 8. Because the observed future trajectories are deterministic, the resulting likelihood is either zero or one.

In the warning example, during deployment, the behavior planning system may select an action $\mathcal{J}_W$ (e.g., warn or ¬warn) that maximizes the utility $u_W$ based on the ego agent and ado agent predictions S. In such examples, a utility may be maximized if a warning is generated when the ado agent and ego agent are likely to collide given the predicted paths. Alternatively, a utility may be maximized if a warning is not generated when the ado agent and ego agent are not likely to collide given the predicted paths.

The model, such as the model 300 described with reference to FIG. 3, may be validated via a motion prediction dataset, such as the Waymo Open Motion dataset. In some examples, a state encoder may encode the observed trajectories O using an MLP with 32 neurons, followed by ReLU and dropout layers with a rate of 0.1. The LSTM may have a hidden size of 32 and an output dimension of 32. The task information encoder may encode the planned trajectory of the ego agent, as the task-specific input V, through an MLP with 32 neurons, followed by ReLU and dropout layers with a rate of 0.1. The trajectory decoder may receive the concatenated encoded states from both encoders, and uses a two-layer MLP with 32 neurons to output S that includes the predicted trajectory samples and their weights. In some examples, a relative weight α between two terms may be equal to twenty to keep the two loss magnitudes on the same scale, and β may be equal to five to prioritize safe driving.

Figure 4:
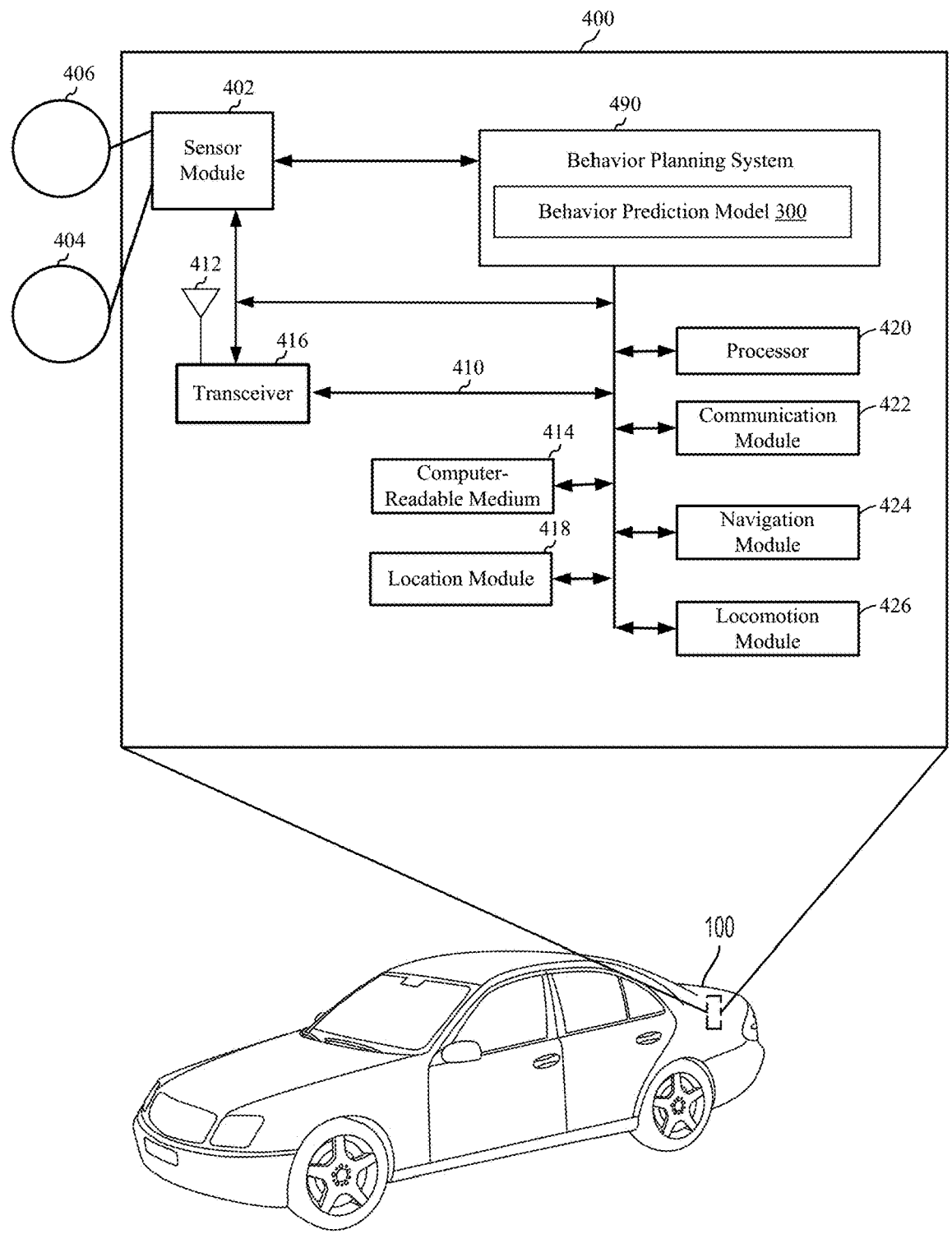
FIG. 4 is a diagram illustrating an example of a hardware implementation for a vehicle control system comprising a behavior planning system, in accordance with aspects of the present disclosure.

FIG. 4 is a diagram illustrating an example of a hardware implementation for a vehicle control system 400, according to aspects of the present disclosure. The vehicle control system 400 may be a component of a vehicle, a robotic device, or other device. For example, as shown in FIG. 4, the vehicle control system 400 is a component of a vehicle 100. Aspects of the present disclosure are not limited to the vehicle control system 400 being a component of the vehicle 100, as other devices, such as a bus, boat, drone, or robot, are also contemplated for using the vehicle control system 400. In the example of FIG. 4, the vehicle system may include an behavior planning system 490. In some examples, behavior planning system 490 is configured to perform operations, including operations of the process 500 described with reference to FIG. 5. The behavior planning system 490 may plan a future trajectory, generate a precollision warning, adjust a behavior based on predicting a potential collision, and/or control one or more behaviors of the vehicle 100.

The vehicle control system 400 may be implemented with a bus architecture, represented generally by a bus 440. The bus 440 may include any number of interconnecting buses and bridges depending on the specific application of the vehicle control system 400 and the overall design constraints. The bus 440 links together various circuits including one or more processors and/or hardware modules, represented by a processor 420, a communication module 422, a location module 418, a sensor module 402, a locomotion module 426, a planning module 424, and a computer-readable medium 414. The bus 440 may also link various other circuits such as timing sources, peripherals, voltage regulators, and power management circuits, which are well known in the art, and therefore, will not be described any further.

The vehicle control system 400 includes a transceiver 416 coupled to the processor 420, the sensor module 402, a comfort module 408, the communication module 422, the location module 418, the locomotion module 426, the planning module 424, and the computer-readable medium 414. The transceiver 416 is coupled to an antenna 444. The transceiver 416 communicates with various other devices over a transmission medium. For example, the transceiver 416 may receive commands via transmissions from a user or a remote device. As another example, the transceiver 416 may transmit driving statistics and information from the comfort module 408 to a server (not shown).

In one or more arrangements, one or more of the modules 402, 414, 416, 418, 420, 422, 424, 426, 490, can include artificial or computational intelligence elements, such as, neural network, fuzzy logic or other machine learning algorithms. Further, in one or more arrangements, one or more of the modules 402, 414, 416, 418, 420, 422, 424, 426, 490 can be distributed among multiple modules 402, 414, 416, 418, 420, 422, 424, 426, 490 described herein. In one or more arrangements, two or more of the modules 402, 414, 416, 418, 420, 422, 424, 426, 490 of the vehicle control system 400 can be combined into a single module.

The vehicle control system 400 includes the processor 420 coupled to the computer-readable medium 414. The processor 420 performs processing, including the execution of software stored on the computer-readable medium 414 providing functionality according to the disclosure. The software, when executed by the processor 420, causes the vehicle control system 400 to perform the various functions described for a particular device, such as the vehicle 428, or any of the modules 402, 414, 416, 418, 420, 422, 424, 426, 490. The computer-readable medium 414 may also be used for storing data that is manipulated by the processor 420 when executing the software.

The sensor module 402 may be used to obtain measurements via different sensors, such as a first sensor 406 and a second sensor 404. The first sensor 406 and/or the second sensor 404 may be a vision sensor, such as a stereoscopic camera or a red-green-blue (RGB) camera, for capturing 2D images. In some examples, one or both of the first sensor 406 or the second sensor 404 may be used to identify an intersection, a crosswalk, or another stopping location. Additionally, or alternatively, one or both of the first sensor 406 or the second sensor 404 may identify objects within a range of the vehicle 100. In some examples, one or both of the first sensor 406 or the second sensor 404 may identify a pedestrian or another object in a crosswalk, such as the crosswalk 202 described with reference to FIG. 2. The first sensor 406 and the second sensor 404 are not limited to vision sensors as other types of sensors, such as, for example, light detection and ranging (LIDAR), a radio detection and ranging (RADAR), sonar, and/or lasers are also contemplated for either of the sensors 404, 406. The measurements of the first sensor 406 and the second sensor 404 may be processed by one or more of the processor 420, the sensor module 402, the comfort module 408, the communication module 422, the location module 418, the locomotion module 426, the planning module 424, in conjunction with the computer-readable medium 414 to implement the functionality described herein. In one configuration, the data captured by the first sensor 406 and the second sensor 404 may be transmitted to an external device via the transceiver 416. The first sensor 406 and the second sensor 404 may be coupled to the vehicle 428 or may be in communication with the vehicle 428.

The location module 418 may be used to determine a location of the vehicle 428. For example, the location module 418 may use a global positioning system (GPS) to determine the location of the vehicle 428. The communication module 422 may be used to facilitate communications via the transceiver 416. For example, the communication module 422 may be configured to provide communication capabilities via different wireless protocols, such as WiFi, long term evolution (LTE), 4G, etc. The communication module 422 may also be used to communicate with other components of the vehicle 428 that are not modules of the vehicle control system 400. Additionally, or alternatively, the communication module 422 may be used to communicate with an occupant of the vehicle 100. Such communications may be facilitated via audio feedback from an audio system of the vehicle 100, visual feedback via a visual feedback system of the vehicle, and/or haptic feedback via a haptic feedback system of the vehicle.

The locomotion module 426 may be used to facilitate locomotion of the vehicle 428. As an example, the locomotion module 426 may control movement of the wheels. As another example, the locomotion module 426 may be in communication with a power source of the vehicle 428, such as an engine or batteries. Of course, aspects of the present disclosure are not limited to providing locomotion via wheels and are contemplated for other types of components for providing locomotion, such as propellers, treads, fins, and/or jet engines.

The vehicle control system 400 also includes the planning module 424 for planning a route or controlling the locomotion of the vehicle 428, via the locomotion module 426. A route may be planned to a passenger based on compartment data provided via the comfort module 408. In one configuration, the planning module 424 overrides the user input when the user input is expected (e.g., predicted) to cause a collision. The modules may be software modules running in the processor 420, resident/stored in the computer-readable medium 414, one or more hardware modules coupled to the processor 420, or some combination thereof.

The behavior planning system 490 may be in communication with the sensor module 402, the transceiver 416, the processor 420, the communication module 422, the location module 418, the locomotion module 426, the planning module 424, and the computer-readable medium 414. In some examples, the behavior planning system may be implemented as a machine learning model, such as a task-informed behavior prediction model 300 as described with reference to FIG. 3. The behavior prediction model 300 may be trained using an approximate utility and potential action examples that are associated with the behavior planning system 490. During training, the behavior prediction model 300 may predict trajectories and associated weights. An action may be selected based on the trajectories and associated weights. Performance of the action selection may be improved by minimizing the loss associated with the action selection. For example, the behavior prediction model 300 may be trained to select an action that correlates to a desired tasks, such as avoiding a collision. Working in conjunction with one or more of the sensors 404, 406 and/or the modules 402, 414, 416, 418, 420, 422, 424, 426, the behavior planning system 490 may observe a previous trajectory of an agent that is within a distance from the vehicle. The behavior planning system 490 may also predict a set of potential trajectories for one or both of the agent and the vehicle based on observing the previous trajectory. The behavior planning system 490 select a potential action from a set of potential actions associated with a task to be performed by the vehicle. Working in conjunction with one or more of the sensors 404, 406 and/or the modules 402, 414, 416, 418, 420, 422, 424, 426, 490, the vehicle 100 may perform an action associated with the potential action selected by the behavior planning system 490. Additionally, or alternatively, the behavior planning system 490 may control the vehicle 100 to perform the action associated with the potential action selected by the behavior planning system 490. As an example, the action may include generating a precollision warning, changing a route, or performing another type of action.

Figure 5:
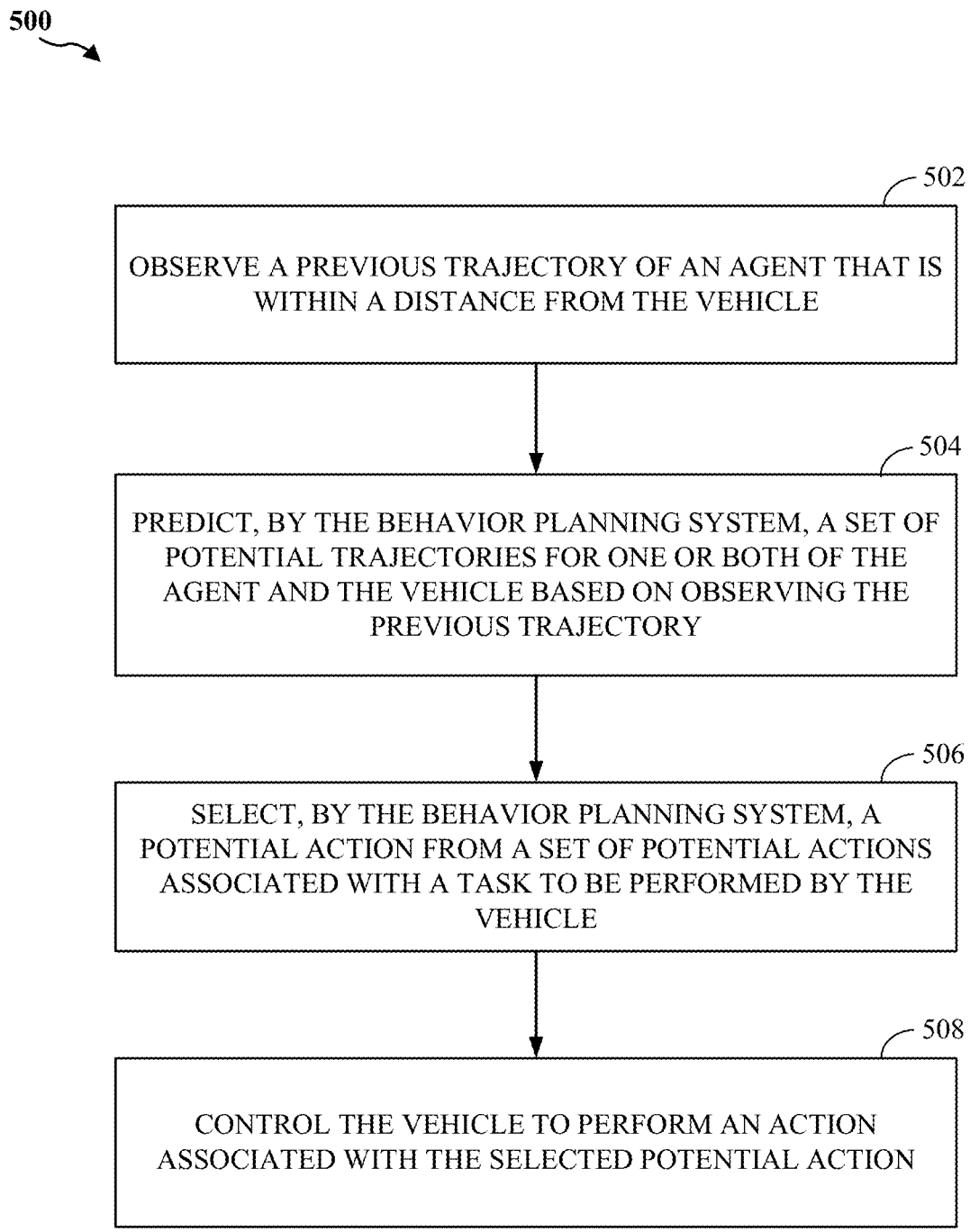
FIG. 5 illustrates a flow diagram for a process for adjusting an acceleration rate of a vehicle, in accordance with aspects of the present disclosure.

FIG. 5 illustrates a flow diagram for a process 500 for task-informed behavior planning, in accordance with aspects of the present disclosure. The process 500 may be performed by a behavior planning system of a vehicle, such as the vehicle 100 described with reference to FIGS. 1A, 1B, 2B, 2C, and 4. The behavior planning system may be an example of the behavior planning system 490 described with reference to FIG. 4. As shown in FIG. 5, the process 500 begins at block 502, by observing a previous trajectory of an agent that is within a distance from the vehicle. At block 504, the process 500 may predict, by the behavior planning system, a set of potential trajectories for one or both of the agent and the vehicle based on observing the previous trajectory. At block 506, the process 500 selects, by the behavior planning system, a potential action from a set of potential actions associated with a task to be performed by the vehicle.

Each potential action may be associated with a utility value based on the respective potential action and the set of potential trajectories. The selected potential action may be associated with a highest utility value of respective utility values associated with the set of potential actions. In some examples, the process 500 may receive a set of inputs associated with the task.

In some examples, the task may include trajectory planning for the vehicle. In such examples, the set of inputs includes the set of potential actions and the set of potential actions include a set of candidate trajectories of the vehicle. Furthermore, the predicted set of potential trajectories includes potential trajectories of the agent.

In some other examples, the task is warning generation at the vehicle. In such examples, the set of potential actions include a first potential action associated with generating a warning and a second potential action associated with not generating the warning. Additionally, the predicted set of potential trajectories include a set of potential agent trajectories a set of potential vehicle trajectories. In some such examples, the utility value is based on a warning term associated with a likelihood of a collision between each potential agent trajectory of the set of potential agent trajectories and each potential vehicle trajectory of the set of potential vehicle trajectories.

In some examples, the behavior planning system is trained to determine the utility value based on a utility function that uses an efficiency term and a safety term. In such examples, the efficiency term is based on a distance traveled by one candidate trajectory of the set of candidate trajectories. Furthermore, the safety term is based on an expected closes distance between one candidate trajectory of the set of candidate trajectories and the set of potential trajectories. In some examples, the behavior planning system is trained to predict the set of potential trajectories by minimizing a loss between a set of potential training trajectories and a ground truth trajectory. In such examples, the behavior planning system may be trained to select the potential action by minimizing a cross entropy between a decision utility and a ground truth decision.

At block 508, the process 500 controls the vehicle to perform an action associated with the selected potential action. The action may include generating a precollision warning, adjusting a route to avoid a collision, changing a future trajectory, and/or performing another type of action.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for task-informed planning by a behavior planning system of an autonomous vehicle, comprising:
observing, via one or more sensors associated with the autonomous vehicle, a previous trajectory of an agent that is within a distance from the autonomous vehicle;
predicting, by the behavior planning system, a first set of potential trajectories for the agent and a second set of potential trajectories of the autonomous vehicle based on observing the previous trajectory;
selecting, by the behavior planning system, a potential action from a set of potential actions associated with a task to be performed by the vehicle, each potential action being associated with a utility value that is a function of both an efficiency term and a safety term, each of the efficiency term and the safety term being associated with the potential action in accordance with the first set of potential trajectories and the second set of potential trajectories, the selected potential action being associated with a highest utility value of respective utility values associated with the set of potential actions; and
autonomously performing, by the autonomous vehicle, an action associated with the selected potential action.

2. The method of claim 1, further comprising receiving a set of inputs associated with the task.

3. The method of claim 2, wherein:
the task is trajectory planning for the vehicle;
the set of inputs includes the set of potential actions;
the set of potential actions include a set of candidate trajectories of the vehicle; and
the predicted set of potential trajectories includes potential trajectories of the agent.

4. The method of claim 3, wherein:
the behavior planning system is trained to determine the utility value based on the function that uses the efficiency term and the safety term;
the efficiency term is based on a distance traveled by one candidate trajectory of the set of candidate trajectories; and
the safety term is based on an expected closest distance between one candidate trajectory of the set of candidate trajectories and the set of potential trajectories.

5. The method of claim 1, wherein:
the task is warning generation at the vehicle;
the set of potential actions include a first potential action associated with generating a warning and a second potential action associated with not generating the warning; and
the predicted set of potential trajectories include a set of potential agent trajectories a set of potential vehicle trajectories.

6. The method of claim 5, wherein the warning term is associated with a likelihood of a collision between each potential agent trajectory of the set of potential agent trajectories and each potential vehicle trajectory of the set of potential vehicle trajectories.

7. The method of claim 1, further comprising:
training the behavior planning system to predict the set of potential trajectories by minimizing a loss between a set of potential training trajectories and a ground truth trajectory; and
training the behavior planning system to select the potential action by minimizing a cross entropy between a decision utility and a ground truth decision.

8. An apparatus for task-informed planning by a behavior planning system of a vehicle, comprising:
at least one processor; and at least one memory coupled with the at least one processor and storing instructions operable, when executed by the at least one processor, to cause the apparatus:
  observe, via one or more sensors associated with the autonomous vehicle, a previous trajectory of an agent that is within a distance from the autonomous vehicle;
  predict, by the behavior planning system, a first set of potential trajectories for the agent and a second set of potential trajectories of the autonomous vehicle based on observing the previous trajectory;
  select, by the behavior planning system, a potential action from a set of potential actions associated with a task to be performed by the vehicle, each potential action being associated with a utility value that is a function of both an efficiency term and a safety term, each of the efficiency term and the safety term being associated with the potential action in accordance with the first set of potential trajectories and the second set of potential trajectories, the selected potential action being associated with a highest utility value of respective utility values associated with the set of potential actions; and
  autonomously perform, by the autonomous vehicle, an action associated with the selected potential action.

9. The apparatus of claim 8, wherein execution of the instructions further cause the apparatus to receive a set of inputs associated with the task.

10. The apparatus of claim 9, wherein:
  the task is trajectory planning for the vehicle;
  the set of inputs includes the set of potential actions;
  the set of potential actions include a set of candidate trajectories of the vehicle; and
  the predicted set of potential trajectories includes potential trajectories of the agent.

11. The apparatus of claim 10, wherein:
  the behavior planning system is trained to determine the utility value based on the function that uses the efficiency term and the safety term;
  the efficiency term is based on a distance traveled by one candidate trajectory of the set of candidate trajectories; and
  the safety term is based on an expected closest distance between one candidate trajectory of the set of candidate trajectories and the set of potential trajectories.

12. The apparatus of claim 8, wherein:
  the task is warning generation at the vehicle;
  the set of potential actions include a first potential action associated with generating a warning and a second potential action associated with not generating the warning; and
  the predicted set of potential trajectories include a set of potential agent trajectories a set of potential vehicle trajectories.

13. The apparatus of claim 12, wherein the warning term is associated with a likelihood of a collision between each potential agent trajectory of the set of potential agent trajectories and each potential vehicle trajectory of the set of potential vehicle trajectories.

14. The apparatus of claim 8, wherein execution of the instructions further cause the apparatus to:
  train the behavior planning system to predict the set of potential trajectories by minimizing a loss between a set of potential training trajectories and a ground truth trajectory; and
  train the behavior planning system to select the potential action by minimizing a cross entropy between a decision utility and a ground truth decision.

15. A non-transitory computer-readable medium having program code recorded thereon for task-informed planning by a behavior planning system of a vehicle, the program code executed by at least one processor and comprising:
  program code to observe, via one or more sensors associated with the autonomous vehicle, a previous trajectory of an agent that is within a distance from the autonomous vehicle;
  program code to predict, by the behavior planning system, a first set of potential trajectories for the agent and a second set of potential trajectories of the autonomous vehicle based on observing the previous trajectory;
  program code to select, by the behavior planning system, a potential action from a set of potential actions associated with a task to be performed by the vehicle, each potential action being associated with a utility value that is a function of both an efficiency term and a safety term, each of the efficiency term and the safety term being associated with the potential action in accordance with the first set of potential trajectories and the second set of potential trajectories, the selected potential action being associated with a highest utility value of respective utility values associated with the set of potential actions; and
  program code to autonomously perform, by the autonomous vehicle, an action associated with the selected potential action.

16. The non-transitory computer-readable medium of claim 15, wherein the program code further comprises program code to receive a set of inputs associated with the task.

17. The non-transitory computer-readable medium of claim 16, wherein:
  the task is trajectory planning for the vehicle;
  the set of inputs includes the set of potential actions;
  the set of potential actions include a set of candidate trajectories of the vehicle; and
  the predicted set of potential trajectories includes potential trajectories of the agent.

18. The non-transitory computer-readable medium of claim 17, wherein:
  the behavior planning system is trained to determine the utility value based on the function that uses the efficiency term and the safety term;
  the efficiency term is based on a distance traveled by one candidate trajectory of the set of candidate trajectories; and
  the safety term is based on an expected closest distance between one candidate trajectory of the set of candidate trajectories and the set of potential trajectories.

19. The non-transitory computer-readable medium of claim 15, wherein:
  the task is warning generation at the vehicle;
  the set of potential actions include a first potential action associated with generating a warning and a second potential action associated with not generating the warning; and
  the predicted set of potential trajectories include a set of potential agent trajectories a set of potential vehicle trajectories.

20. The non-transitory computer-readable medium of claim 19, wherein the warning term is associated with a likelihood of a collision between each potential agent trajectory of the set of potential agent trajectories and each potential vehicle trajectory of the set of potential vehicle trajectories.

* * * * *